United States Patent Office 2,837,561
Patented June 3, 1958

2,837,561

PREPARATION OF ORGANIC MONO-CARBAMATES

Sidney Beinfest and Phillip Adams, Berkeley Heights, and Joseph Halpern, New Providence, N. J., assignors to Berkeley Chemical Corporation, Berkeley Heights, N. J., a corporation of New Jersey No Drawing. Application May 31, 1956
Serial No. 588,230

4 Claims. (Cl. 260—482)

This invention relates to new and useful improvements in the preparation of organic monocarbamates, especially aliphatic including alkyl carbamates.

This application is a continuation-in-part of Serial No. 560,856 filed January 23, 1956.

Aliphatic monocarbamates such as ethyl carbamate have been finding increasing utility both as medicinals themselves and particularly as reactants in the preparation of alkanediol dicarbamates, a promising class of "tranquilizing" drugs.

These monocarbamates have been prepared by heating large excesses of a relatively high boiling alcohol and urea for comparatively long periods of time. This method is fairly efficient for relatively high boiling alcohols, e. g. n-dodecyl carbamate forms 60% of the theoretical at 170°–190° C. in 5 hours.

On the other hand lower alcohols require excessively long times to undergo the same reaction and even then yields are not too satisfactory. Thus, Organic Syntheses, Collective Volume I, page 140, heats 13.1 moles of n-butanol with 3 moles of urea for 30 hours to obtain a 75% yield of n-butyl carbamate. Isobutyl alcohol (B. P. 108° C.) heated for 72 hours with urea gave only a 42.8% conversion to isobutyl carbamate. The increased use of the lower aliphatic monocarbamates in synthesis reactions thus depends on an improved method of preparing them.

It has now been found that organic monocarbamates, especially lower aliphatic (including alicyclic), and particularly alkyl monocarbamates can be obtained in improved yields in much shorter periods of time by conducting the beforementioned reaction in the presence of a cupric salt catalyst and sharply restricting the excess of alcohol. In this manner the reaction of n-butanol has been substantially completed in 3 rather than 30 hours. The equation for the reaction is illustrated below for the preparation of ethyl carbamate from ethanol and urea.

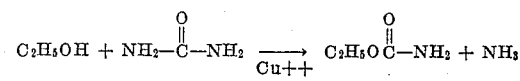

Typical organic monohydric alcohols that can be employed in the preparation of organic carbamates by the process of this invention are benzyl alcohol, substituted derivatives of the latter, stearyl alcohol, methallyl alcohol and cyclohexanol. While the reaction controls and catalyst can be employed generally for monohydric alcohols it is particularly adapted for use with those lower aliphatic monohydric alcohols which normally require excessive periods of time. The preferred aliphatic alcohols utilized thus have a normal boiling point in the range of 64.7° to 195° C. Typical of the lower alcohols that can be used are methanol, ethanol, n-butanol 2-methoxyethanol (B. P. 124° C.), and n-octanol. As is apparent, the alcohols are not diluted with water and they can be used in the form usually available commercially. Thus methanol and ethanol are preferably employed in the anhydrous form available.

The reaction temperature utilized is in the range of 110–200° C., preferably 120–160° C. It is significant in this connection that with the two lowest boiling alcohols, methanol and ethanol, it had previously been impossible to obtain carbamates by heating with urea at atmospheric pressure, due to the low temperature obtained in the boiling alcohol solution. The use of the process of this invention has resulted in the obtaining of methyl carbamate and ethyl carbamate at atmospheric pressure and temperatures of 130–150° C.

The quantity of reactants has also been found to be important. The amount of alcohol used in excess has been curtailed and need not be used in an amount greater than 1.5 mol/1 mol based on the urea. Use of larger quantities results in increases in time and space requirements and makes more difficult the obtaining of the desired temperature. In this connection, particularly with the lower alcohols, it is desirable to add the latter gradually. The maintenance of the temperature within the range desired, or determination of $NH_3$ evolved as by titration, can be used to control this gradual addition.

The catalyst employed is a cupric salt of a carboxylic acid. This should be noted, particularly as these other metals have been considered typical catalysts for many reactions. The amount of salt utilized is preferably in the range of 0.001–0.5 mol/mol urea. Typical catalysts include cupric acetate, formate. Aluminum alkoxides and ammonium acetate also are somewhat effective.

This invention will be better understood by reference to the following examples of the preparation of the indicated compounds according to the process of this invention.

*Example 1.—Preparation of methyl carbamate*

Sixty gms. (1 mol) of urea and 4 gms. (0.2 mol) of cupric acetate were placed in a 250 cc., 3 neck flask together with ½ cc. methanol. The mixture was heated to 130° C. and a clear, blue solution was obtained. One mol of methanol was added gradually at the same rate as $NH_3$ was evolved. The reaction was completed after 3 hours. Methyl carbamate was separated by fractionation at reduced pressure. The yield was 31.1 gm. and the M. P. was 54° C. The percentage yield of 41.4% is very good since the product had never been obtained under these conditions before.

*Example 2.—Preparation of ethyl carbamate*

The system employed and conditions were the same as Example 1 except for the utilization of ethanol instead of methanol. A 60% theoretical yield or 53.5 gms. of 49° C. M. P. product was obtained.

*Example 3.—Preparation of n-butyl carbamate*

60 gms. (1 mol) of urea, 100 cc. (1.1 mol) n-butanol and 2 gms. (.01 mol) cupric acetate were placed in a flask and refluxed for 4 hours until 99.5% of the theoretical amount of $NH_3$ was evolved. The temperature ranged from 118–160° C. 83.2 gms. of n-butyl carbamate having a M. P. of 52° C. was obtained.

*Example 4.—Preparation of 2-methoxy ethyl carbamate*

60 gms. (1 mol) of urea, 87 cc. (84 gms. 1.1 mol) of methyl Cellosolve and 2 gms. (.01 mol) cupric acetate were charged to a flask and refluxed at a temperature in the range of 120–160° C. for 4 hours. 80% of the theoretical $NH_3$ was collected. On distillation 59.5 gms. pure product having a M. P. of 46.8° C. was collected.

The monocarbamates are readily obtained from the reaction systems by first distilling off the alcohols and then distilling off the product at reduced pressures. The products obtained in this manner are of acceptable commerial grade.

The advantages of this invention will be apparent to the skilled in the art. High yields of relatively pure products are obtained in a minimum of time with consequent great savings in equipment sizes.

It is understood that this invention is not limited to the specific examples which have been offered merely as illustrations and that modifications may be made without departing from the spirit of the invention.

What is claimed is:

1. In a process for preparing an alkyl monocarbamate which comprises reacting an aliphatic monohydric alcohol having a normal boiling point in the range of 64.7 to 195° C. with urea at a temperature in the range of 120° to 160° C., the maximum amount of alcohol utilized being 1.5 mol/mol urea, the improvement which comprises carrying out the reaction in the presence of cupric acetate as a catalyst, the catalyst being utilized in an amount of from 0.001 to 0.5 mol/mol of urea.

2. The process of claim 1 in which the alkyl monocarbamate being prepared is methyl carbamate and the alcohol is methanol.

3. The process of claim 1 in which the alkyl monocarbamate being prepared is ethyl carbamate and the alcohol is ethanol.

4. The process of claim 1 in which the alkyl monocarbamate being prepared is n-butyl carbamate and the alcohol is n-butanol.

References Cited in the file of this patent

UNITED STATES PATENTS 2,388,148   Hetherington _____ Oct. 30, 1945

FOREIGN PATENTS 753,127   Germany _____ Nov. 24, 1952